(No Model.)　　　　　　　　　　　　　　　　　　3 Sheets—Sheet 1.
W. P. KIDDER.
TYPE WRITING MACHINE.
No. 471,794.　　　　　　　　　　　Patented Mar. 29, 1892.
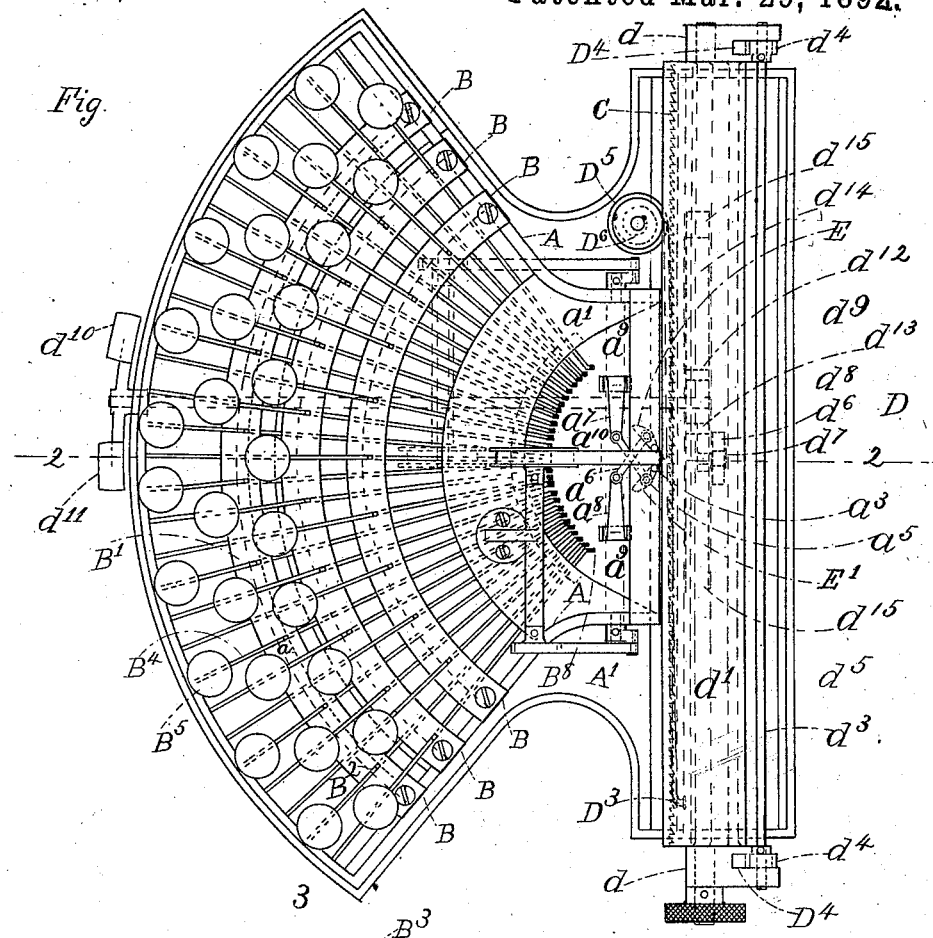
Fig.
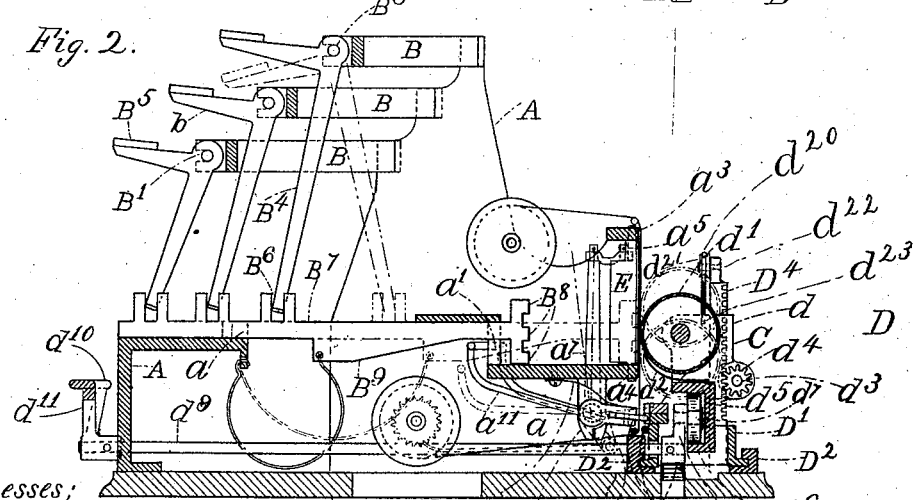
Fig. 2.
Witnesses:
J. E. Maynadier
Edward S. Beach.
Inventor,
Wellington P. Kidder (No Model.) 3 Sheets—Sheet 2.

W. P. KIDDER.
TYPE WRITING MACHINE.

No. 471,794. Patented Mar. 29, 1892.

Witnesses:
J. E. Maynadier
Edward S. Beach

Inventor,
Wellington P. Kidder.

(No Model.) 3 Sheets—Sheet 3.
W. P. KIDDER.
TYPE WRITING MACHINE.
No. 471,794. Patented Mar. 29, 1892.
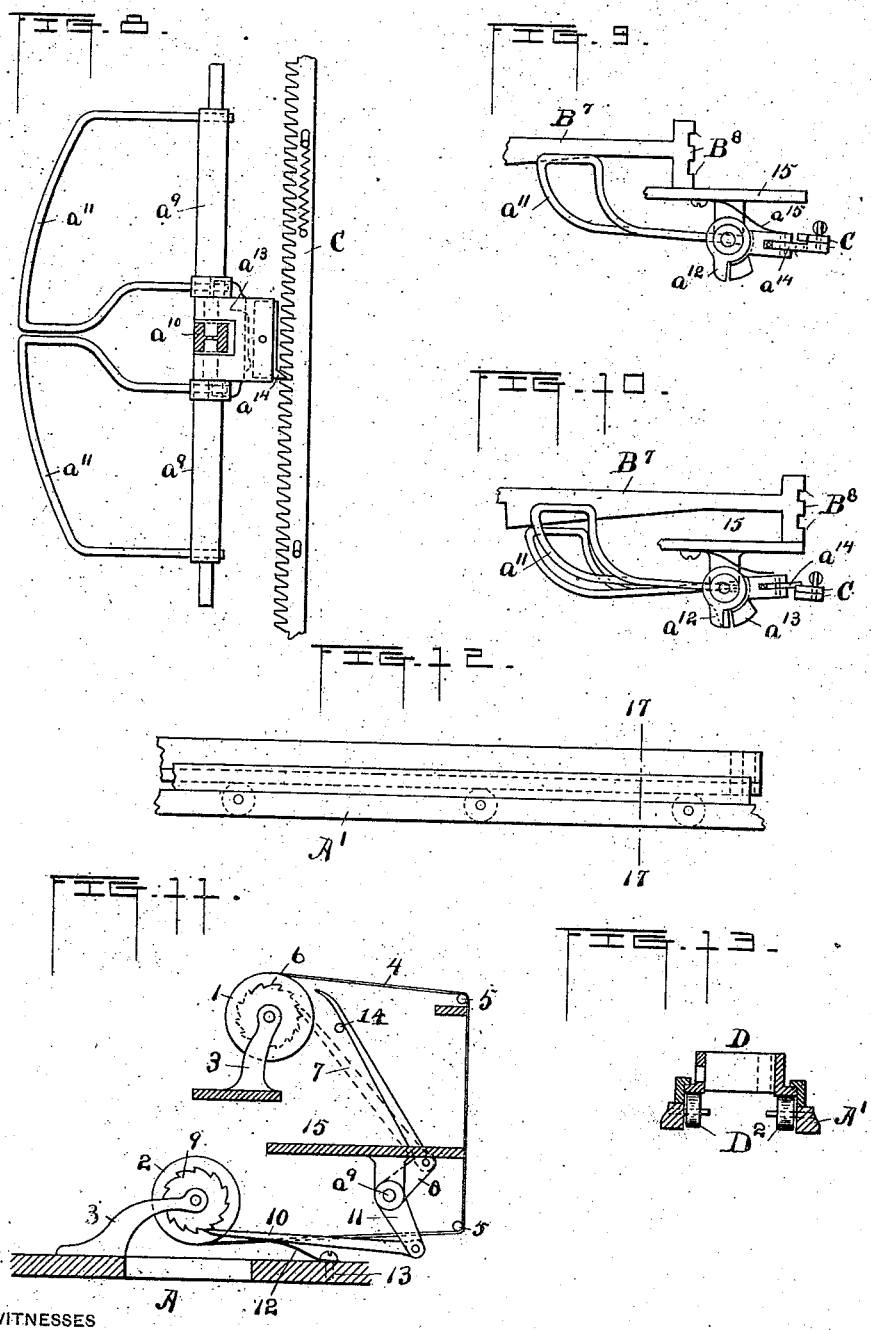

UNITED STATES PATENT OFFICE.

WELLINGTON P. KIDDER, OF BOSTON, MASSACHUSETTS, ASSIGNOR OF ONE-THIRD TO CLEMENT B. SMYTH.

TYPE-WRITING MACHINE.

SPECIFICATION forming part of Letters Patent No. 471,794, dated March 29, 1892.

Application filed March 23, 1891. Serial No. 386,133. (No model.)

*To all whom it may concern:*

Be it known that I, WELLINGTON PARKER KIDDER, of Boston, in the county of Suffolk and State of Massachusetts, have invented a new and useful Improvement in Type-Writing Machines, of which the following is a specification, reference being had to the accompanying drawings, in which—

Figure 3:
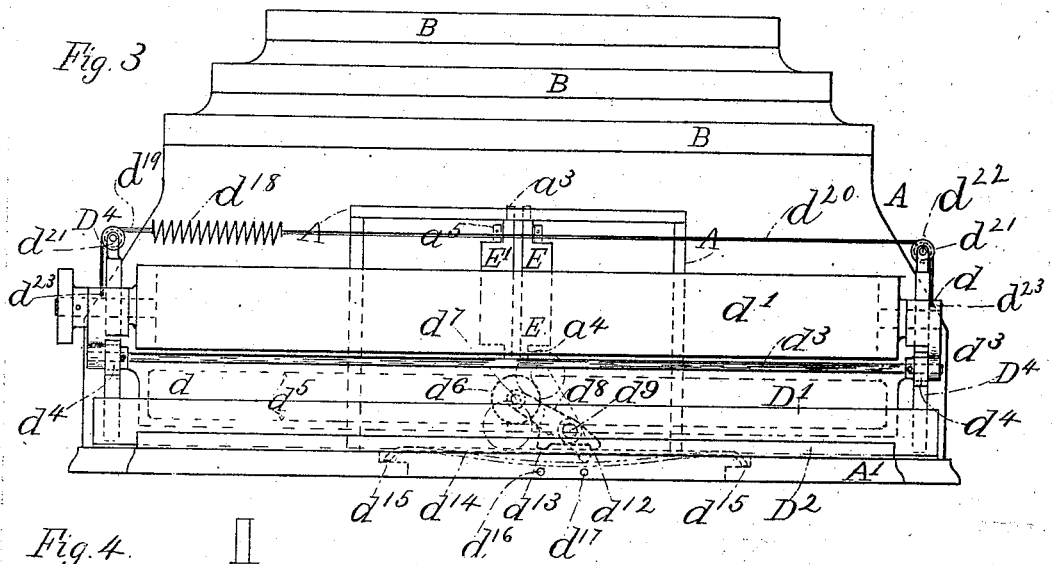

Figure 1 is a plan of the preferred arrangement of my invention. The scale is about two-thirds of full size. Fig. 2 is a sectional elevation through line 2 2 of Fig. 1. In this sectional view three only of the key-levers are shown, all others being simply duplicates.
Fig. 3 is a partial rear elevation showing more particularly the mechanism for effecting the vertical shift of the paper-carriage; Figs. 4, 5, 6, and 7, details showing the movable wings for side guides to the ends of the type-bars at the printing-point and a part of the escapement mechanism. Fig. 8 is a partial plan of the rocker-shafts and carriage-actuating mechanism. Fig. 9 is an end elevation of what is shown in Fig. 8 with the type-bar supporting plate added and showing a type-bar and the rocker-shafts in their normal position. Fig. 10 is a similar view, except that the type-bar is forward to the printing-point and has actuated one of the rocker-shafts to operate the pawl of the escapement mechanism. Fig. 11 is a sectional view more clearly showing inking mechanism. Fig. 12 is a partial elevation of the paper-carriage mounted upon rollers. Fig. 13 is a section on line 17 17 of Fig. 12.

My improvements apply to that class of many-keyed instruments in which the type-characters are placed on the ends of the sliding bars, radially mounted to deliver impressions at a common printing-point by end-thrust. By placing all type-bars in a single and preferably horizontal plane and by attaching the key-levers directly to the bars without intermediate mechanism, and, further, by attaching two or more characters to each type-bar, thereby greatly reducing the number of keys and type-bars in machines of a given number of characters using a vertical shift for the paper-carriage, I am able to construct a machine of much greater simplicity, less expensive, more compact, and yet admitting the maximum of speed and utility.

I will now describe the parts and movements of my machine.

A represents the frame, and A' the base.

B B B are three curved supports for the pivots of the three banks of key-levers. The ends of these supports are fast to the frame A. The supports are grooved B' and slotted $B^2$ to receive the pivots $B^3$ of the key-levers $B^4$. Each key-lever is provided with a finger button or surface $B^5$ on its nearly-horizontal arm $b$, while its nearly-vertical arm, bent at its lower end to a right angle, passes through or engages a slot $B^6$, formed in type-bar $B^7$.

Figure 4:
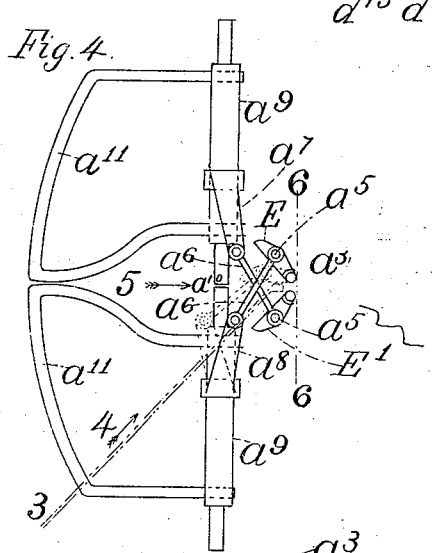
Figure 5:
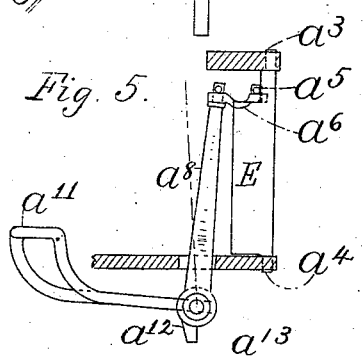
Figure 6:
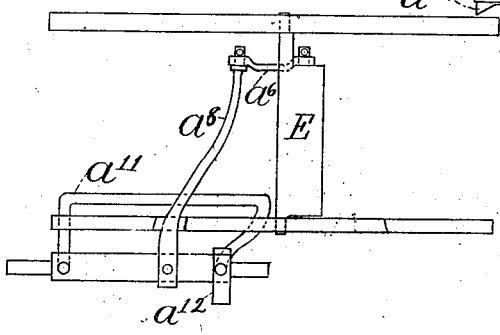
Figure 7:
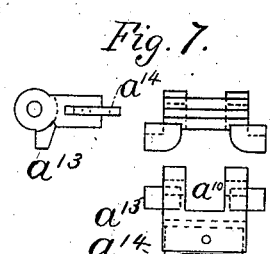

The type-bars $B^7$, formed, preferably, of thin sheet-metal, slide freely longitudinally in suitable grooves formed radially in the frame A at $a$ and $a'$. At the forward ends of type-bars $B^7$ are attached two or more type characters $B^8$, in this instance three characters to each bar. An inclined surface $B^9$ is formed on the under side of each type-bar to give motion to the escapement mechanism common to all of the keys for feeding the paper-carriage D and also to give motion to the movable wings E E', the latter being side guides to the type characters at their printing-point. These wings E and E' in their position of rest are as indicated in Figs. 1 and 4, and are pivoted in frame A at $a^3$ and $a^4$. Eccentrically attached at $a^5$ are connecting-links $a^6$, pivoted to levers $a^7$ and $a^8$, fast on rocker-shafts $a^9$, pivoted in the frame. It will be noticed that there are two independent rocker-shafts $a^9$ placed in a line with each other, their inner journals meeting in a common bearing in the center of the machine at $a^{10}$, Fig. 4. Fast in each shaft are the curved rods $a^{11}$, engaged by the inclines $B^9$ on the under sides of the type-bars $B^7$. Motion is imparted to one of these rocker-shafts $a^9$ only when a key on that side of the machine is operated. The other rocker-shaft $a^9$ is operated only by the keys of the other side or half of the machine; but the motion of either rocker-shaft gives proper motion to the escapement mechanism whereby the paper-carriage is moved in the ordinary manner whenever any key on the machine is struck. This is accomplished by a lever $a^{12}$, fast to each rocker-shaft, engaging a common lever $a^{13}$, pivoted on inner journals $a^9$ of shafts and provided with a pawl $a^{14}$ engaging the escapement-racks C of the paper-carriage D, the latter in a manner in common use on other type-writers and too well known to require description. The return rocking motion of shafts $a^9$ and lever $a^{13}$ is effected by any convenient arrangement of springs, as $a^{15}$.

It will be seen that to simply effect the feed of the paper-carriage no necessity exists for making two independent shafts $a^9$; but I utilize these two shafts to operate the movable wings or side guides E and E', which I will now describe.

Side guides to the type ends $B^8$ of the bars $B^7$ at or near the point of impression are necessary to deflect the type from the longitudinal direction of the bars in their various angles to a direction at right angles to the surface of the paper to be printed. Such guides might be rigidly fixed to the frame A; but this would cause the bars at the extreme sides of the machine to enter between the guides with too much friction on account of the steep angles of contact—as, for instance, dotted type-bar 3 in Fig. 4, moving in the direction of the arrow 4 against guide E, striking its surface at too nearly a right angle to be easily deflected in the direction of arrow 5 between the guides E E' to the impression on line 6. To remedy this, whenever a bar on one side of the machine, as bar 3, in Fig. 4, is struck the guide E of the opposite side is swung forward to a position at or near a right angle to the surface of the paper, as shown in dotted lines in Fig. 4, thereby offering a comparatively easy inclined surface to the type, whereby it is deflected directly to the impression, which is at line 6. In like manner whenever a key of the opposite half of the machine is struck the other guide E' is swung forward. These movements are accomplished by one of the links $a^6$, connecting guide E' of one side with lever $a^7$ of rocker-shaft $a^9$ of the opposite side of the machine, and the other link $a^6$ vice versa, the two links in crossing each other being properly offset to pass without interference. It is evident that the normal position of these wings might be closed instead of open, as shown, and the mechanism arranged to open either of them out of the path of an approaching type-bar, as required, or, instead of swinging, they might be moved into position in a variety of ways, all of which would constitute a part of my invention.

My new vertical shift paper-carriage consists of a sliding or moving frame D', mounted on rollers or in slides $D^2$ on the base A'. To this frame may be attached an ordinary cord $D^3$, leading to a drum $D^5$, provided with the usual coil-spring $D^6$ for drawing the carriage; also with the usual fast and loose racks C, engaged by the pawl $a^{14}$, forming the well-known escapement in common use. Standing upright and fast in the moving frame D' near its opposite ends are the two racks $D^4$, which also serve as guide-posts to a second frame d, carrying the paper-roll d', with clamp-plate $d^2$, between which plate and roll the paper is secured in the usual manner to receive its impressions from type-bars. Journaled in the ends of the secondary or upper frame d is freely mounted the shaft $d^3$, to which are fast two pinions or gears $d^4$, engaging the upright rack-posts $D^4$. The object of the rack, gears, and shaft is simply to keep the frame d in a parallel position as it is moved vertically up and down on the guide-posts $D^4$. This vertical shift of the frame d, carrying the paper-roll d', is for the purpose of presenting the line on the paper to be printed to either of the three characters $B^8$ of type-bars $B^7$, and corresponds to the horizontal shift on ordinary type-lever machines. It is accomplished as follows: A path $d^5$ is formed in the carriage-frame d, which receives the friction-roller $d^6$, pivoted on stud $d^7$, fast on one end of rocker-shaft $d^9$, journaled in base of frame A. The opposite end of rocker-shaft $d^9$ receives the double-armed levers $d^{10}$ $d^{11}$, provided with finger buttons or surfaces for use similar to the key-lever buttons $B^5$ or other arrangement of $d^{10}$ and $d^{11}$ may be substituted. The under surface of the lever $d^8$ is formed with two bearers $d^{12}$ $d^{13}$, resting against the firm pressure of a spring $d^{14}$, supported at its ends $d^{15}$ on base A'. The normal vertical position of the carriage d is shown in the drawings, both feet or points $d^{12}$ $d^{13}$ of lever $d^8$ resting on the spring $d^{14}$, supporting the printing-point on the roll d' opposite the central type characters $B^8$ on the type-bars $B^7$. Depressing the lever $d^{10}$, rocking the shaft $d^9$, raises the friction-roll $d^6$, as indicated in dotted lines in Fig. 3, depressing the spring $d^{14}$, as indicated. In like manner if lever $d^{11}$ be depressed roll $d^6$ is carried below the normal position, as indicated, also depressing spring $d^{14}$, in either case acting in path $d^5$ to raise or lower the paper-carriage d to either the upper or lower type characters $B^8$ of the type-bar $B^7$, the spring $d^{14}$ returning the carriage to the normal position whenever the key $d^{11}$ or $d^{10}$ is released. Any suitable stops, as $d^{16}$ and $d^{17}$, may be provided to limit the vertical motion of the carriage in either direction. In some cases I intend to neutralize the dead-weight of the carriage d and roll d' by springs or counter-weights, in order that either shift-key $d^{10}$ or $d^{11}$ may be operated with equal facility. This may be accomplished by a spiral spring $d^{18}$, attached to cords $d^{19}$ and $d^{20}$, led over friction-pulleys $d^{21}$, mounted on studs $d^{22}$, fast in upper ends of racks or guide-posts $D^4$, the ends of the cords attached to carriage d at $d^{23}$. (See Figs. 2 and 3.)

A convenient form of inking mechanism consists of spools 1 and 2, journaled in brackets 3, fast to the frame of the machine. The ink-ribbon 4 leads from one spool to the other over suitable guides 5, passing between the inner ends of the type-bars and the platen. Roll 1 is provided with a ratchet-wheel 6, with which engages a pawl 7, mounted on an arm 8, fast on rocker-shaft $a^9$. Spool 2 is provided with a ratchet-wheel 9, with which engages a pawl 10, mounted on an arm 11, fast on rocker-shaft $a^9$. When the rocker-shaft is actuated, pawl 10 turns ratchet-wheel 9, feeding spool 2 one notch. When all the ribbon has been wound on spool 2, spring 12, pivoted at 13 to the base of the machine, is swung out of engagement with the pawl, which then drops out of engagement with the ratchet-wheel 9, and pawl 7, until now kept out of engagement with ratchet-wheel 6, is allowed to drop into engagement with ratchet-wheel 6 by removing the supporting-pin 14. The ribbon is now rewound on spool 1.

To insure alignment, the inner ends of the type-bars are supported on a guide-plate 15 at the time the impression is taken, plate 15 being supported by the frame of the machine. As the type-levers are moved endwise for impression they preferably slide over the plate 15.

I claim—

1. In a type-writing machine, the combination of side guides E and E' and links $a^6$ with levers $a^7$ and $a^8$ and rocker-shafts $a^9$, the links connecting the levers with the guides and the levers being mounted on the rocker-shafts to actuate the guides, substantially as set forth.

2. In a type-writing machine, a vertical shift paper-carriage in a type-writing-machine carriage $d$, friction-roll $d^6$, and a guide or path $d^5$, formed in carriage $d$, substantially as set forth.

3. In a type-writing machine, the combination of carriage $d$, friction-roll $d^6$, rocker-shaft $d^9$, and a suitable actuating-key, as $d^{10}$, roll $d^6$ being supported on rocker-shaft $d^9$ and the key operating the rocker-shaft to raise and lower roll $d^6$ to raise and lower carriage $d$, substantially as set forth.

4. In a type-writing machine, the combination of a paper-carriage-feeding mechanism with a sliding type-bar having an inclined surface and a rocker-shaft having an arm engaged by said incline to actuate the carriage-feeding mechanism, substantially as set forth.

5. In a type-writer, the combination of a pair of rocker-shafts with a series of type-bars movable endwise, a pair of movable side guides for the type-bars, and mechanism for connecting the side guides with the rocker-shafts, and mechanism for actuating the rocker-shafts, all combined, substantially as described, to deflect the type-bars to the impression-point, substantially as and for the purpose set forth.

6. In a type-writer, the combination of a series of keys and a series of endwise-movable type-bars, which are arranged radially in respect of the printing-point, with a pair of rocker-shafts each supporting a side guide and mechanism for actuating the rocker-shafts, the side guides directing the type-bars to the printing-point, all arranged and operating substantially as and for the purpose set forth.

7. In a type-writer, the combination of carriage $d$, supporting the platen $d'$, with carriage D', pinions $d^4$, shaft $d^3$, racks $D^4$, and mechanism for reciprocating carriage $d$ in a path at an angle to its endwise movement, the pinions and racks meshing to keep carriage $d$ parallel to carriage D', all substantially as and for the purpose set forth.

8. In a type-writer, the combination of carriage $d$, carrying platen $d'$, with carriage D', supporting carriage $d$, and mechanism substantially such as described—that is, roll $d^6$ on rocker-shaft $d^7$ and spring $d^8$—for moving carriage $d$ away from carriage D', all substantially as and for the purpose set forth.

WELLINGTON P. KIDDER.

Witnesses:
J. E. MAYNADIER,
EDWARD S. BEACH.